Figure 1:
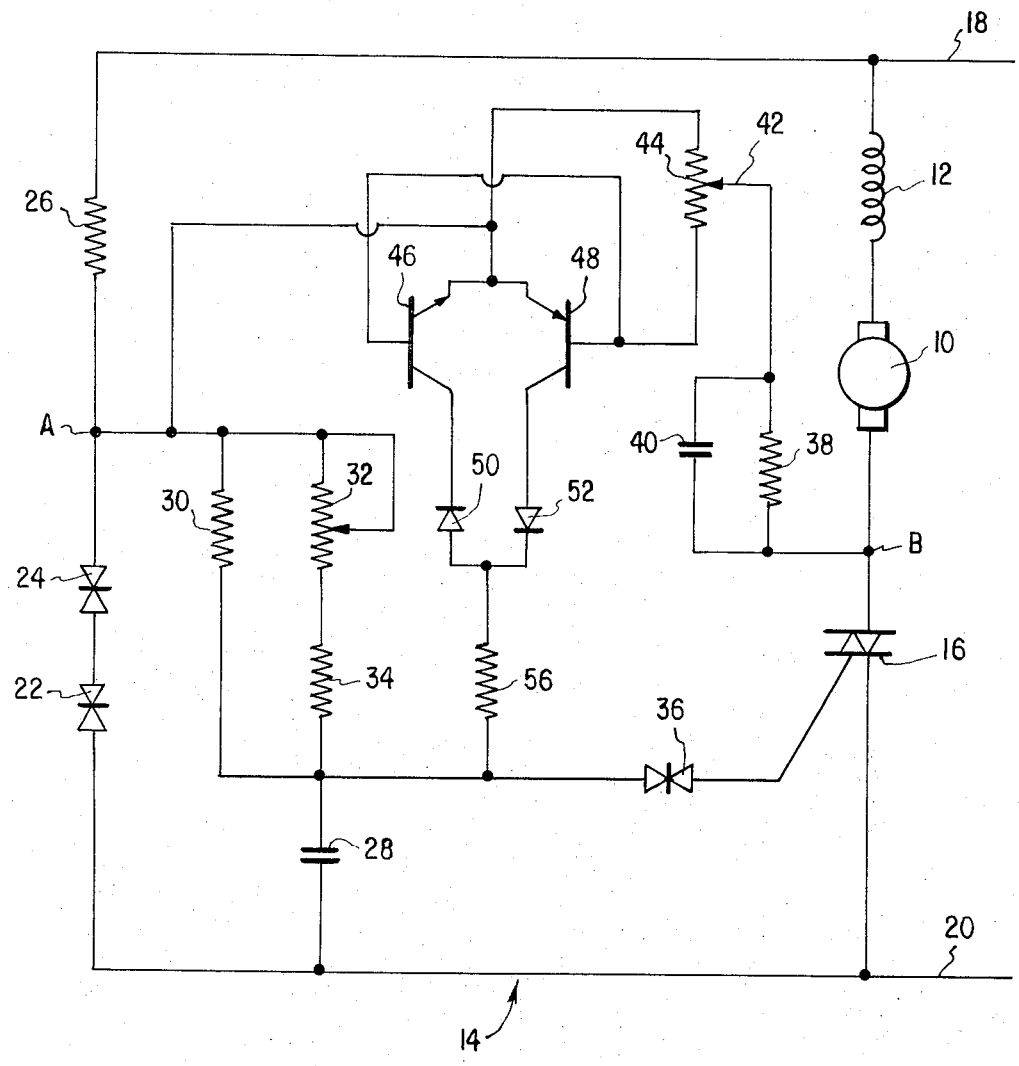

United States Patent [19]

Hoge

[11] 3,809,984
[45] May 7, 1974

[54] MOTOR SPEED CONTROL SYSTEM
[75] Inventor: Henri H. Hoge, Baltimore, Md.
[73] Assignee: Allied Controls Company, Inc., Plantsville, Conn.
[22] Filed: Jan. 29, 1973
[21] Appl. No.: 327,668

[52] U.S. Cl. ............................. 318/244, 318/332
[51] Int. Cl. ........................................... H02p 5/16
[58] Field of Search .......... 318/331, 332, 244, 245, 318/249, 345

[56] References Cited
UNITED STATES PATENTS
3,586,948  6/1971  Broome ............................. 318/332
3,564,372  2/1971  Vogelberg ......................... 318/345

Primary Examiner—Bernard A. Gilheany
Assistant Examiner—Thomas Langer
Attorney, Agent, or Firm—Colton & Stone

[57] ABSTRACT

The motor speed control system includes a bidirectional solid state switch which selectively connects and disconnects a series AC motor to an AC power source during each half cycle of the power supply signal. The decaying armature current is sensed when the motor is disconnected from the power supply at the end of each half cycle to determine the point in the next succeeding half cycle when the motor will be reconnected to the power supply.

10 Claims, 2 Drawing Figures

MOTOR SPEED CONTROL SYSTEM

BACKGROUND OF THE INVENTION

With the development of solid state technology, a large number of solid state systems have been devised for controlling the speed of an electric motor. A number of these solid state motor speed control systems utilize counter electro-motive force (CEMF) developed by the motor as a control factor. Such systems are generally employed in combination with a series electric motor connected to an AC source voltage which is rectified to produce pulsating DC through the motor. The application of this pulsating DC to the motor is generally controlled by a solid state switching unit which is switched from a non-conducting to a conducting state in response to the charge on a control capacitor. The control capacitor is normally charged by a separate charging source, and this charge is selectively opposed by CEMF from the motor. This may be accomplished by directly opposing the capacitor charging voltage with a CEMF signal developed from the motor or by employing a CEMF signal to selectively bleed some of the charge from the charging capacitor.

Known solid state motor speed control systems operate effectively for some applications, but for a number of applications, such systems are grossly deficient. For example, many control systems attempt to maintain a constant current or a constant voltage through the motor field winding and armature. This results in an extensive power loss as the load on the motor increases, and in many instances, a motor stall condition may eventually occur. Control systems of this type prevent the motor for making use of the full power available from the power supply employed.

Additionally, many conventional motor control systems sense the voltage or current flow through the motor armature during one half cycle of an AC input wave and provide a resulting control function during the remaining half cycle. Not only does this type of motor control cause the motor to operate in a one half wave mode with a resultant loss of power, but also the control signal is subjected to all of the residual effects resulting from internal resistance changes in the motor armature.

It is the primary object of the present invention to provide a novel and improved speed control system for a series AC motor which operates effectively to control motor speed while providing the benefit of the full power of an AC supply line to the motor.

Another object of the present invention is to provide a novel and improved speed control system for a series AC motor which permits the application of AC power directly to the motor.

A further object of the present invention is to provide a novel and improved speed control system for a series AC motor which does not provide constant current or voltage regulation for the motor with variations in load for speed control purposes but which instead permits both motor current and voltage to go up with increases in load to increase power.

Another object of the present invention is to provide a novel and improved speed control system for a series AC motor which achieves speed sensing and motor regulation during each half cycle of an AC supply voltage to provide the increased power attendant with full wave motor operation.

A further object of the present invention is to provide a novel and improved speed control system for a series AC motor wherein motor control is achieved by sensing the residual current in the motor armature with the power supply to the motor cut off.

A still further object of the present invention is to provide a novel and improved speed control system for a series AC motor which includes solid state control circuitry readily adaptable for use on power tools and for other applications requiring a compact unit of minimal size.

Figure 2:
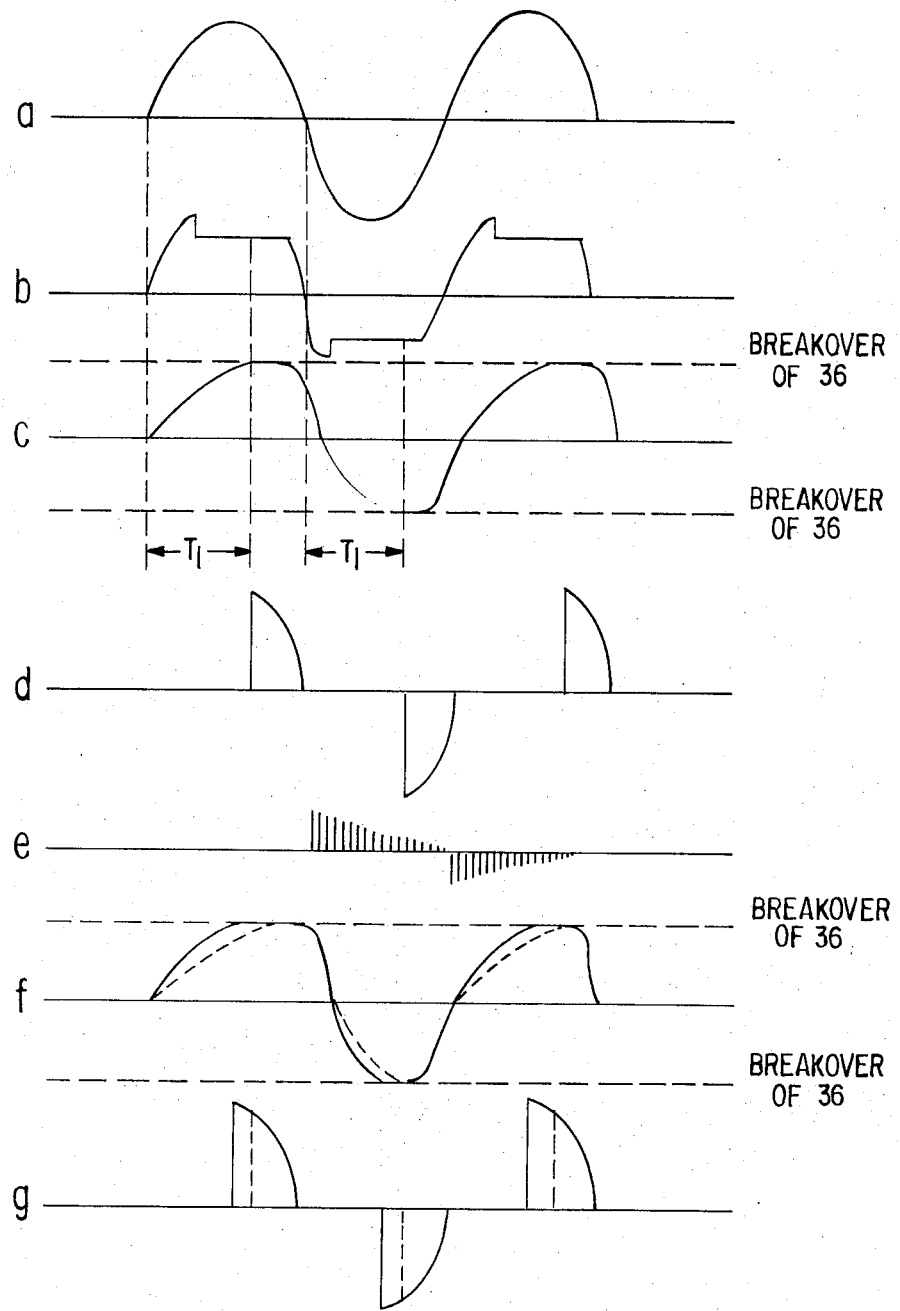

These and other objects of the present invention will become readily apparent upon a consideration of the following specification and claims taken in conjunction with the accompanying drawing in which:

FIG. 1 is a circuit diagram of the speed control system of the present invention, and FIG. 2 illustrates waveforms occurring during the operation of the circuit of FIG. 1.

Referring now to the drawings, a series AC motor having an armature 10 and a field winding 12 is controlled by a speed control system indicated generally at 14. This speed control system includes a bidirectional semiconductor switch (such as a Triac) 16 connected in series with the field and armature of the AC motor across input lines 18 and 20 which in turn are connected to a suitable AC power supply (not shown).

The speed control system 14 includes a reference circuit connected across the input lines 18 and 20 which includes bidirectional trigger diodes (such as Diacs) 22 and 24 in series with a resistor 26. The bidirectional trigger diodes are used as back to back Zener regulators, and obviously could be replaced by back to back Zener diodes or similar equivalent circuit components. The diodes 22 and 24 with the resistor 26 define a reference point A which operates as a source of reference voltage for the speed control system 14. The AC input voltage on input lines 18 and 20 (FIG. 2a) is converted by the trigger diodes 22 and 24 into a substantially square wave voltage waveform (FIG. 2b) having a predetermined amplitude. For example, the trigger diodes might have a switch-back voltage rating of 28 volts, thereby providing a square wave reference voltage at point A having an amplitude which is approximately 56 volts.

The regulated voltage at point A is used as a reference source for charging a capacitor 28 across a resistor 30, a variable resistor 32, and a resistor 34. Thus the voltage on the capacitor 28 rises during each half cycle of the AC supply voltage on the lines 18 and 20 until the breakover voltage of a Diac 36, connected to the capacitor 28, is reached. The waveform for this capacitor charging voltage is illustrated in FIG. 2c, and the time T1 required for the capacitor 28 to charge to the breakover level of the Diac 36 may be varied by varying the resistance of the variable resistor 32. Thus, the variable resistor 32 may be used to preset the slope of the capacitor charging voltage and the point in the cycle of the input AC waveform where the Diac 36 will fire to allow the energy accumulated by the capacitor 28 to be discharged into the gate electrode of the Triac 16. The Diac 36 may have a switch-back voltage rating of 5 volts, and, when fired, allows the energy accumulated by the capacitor 28 to trigger the Triac 16 into conduction so that the input lines 18 and 20 provide power to the series connected armature 10 and field 12 on each half cycle of the AC input signal.

The waveforms illustrated in FIG. 2a, b, and c are indicative of the operation of the speed control system 14 if only the Triac 16 is connected to the armature 10 and the circuit connection at a point B between the armature and Triac is broken. However, the circuit connected at point B provides the sensing functions for control of the speed control system 14, and includes a parallel connected resistor 38 and capacitor 40 connected to the variable control arm 42 of a variable resistance 44. One side of the variable resistance 44 is connected directly to point A while the other side of the variable resistance is directly connected to the base electrodes of two complementary transistors 46 and 48. Transistor 46 may constitute an NPN transistor while transistor 48 may constitute a PNP transistor, such transistors having commonly connected emitter electrodes which are directly connected to point A and the variable resistance 44 and commonly connected base electrodes also connected directly to the variable resistance 44. The collector electrodes of the transistors 46 and 48 are connected respectively by reversely poled diodes 50 and 52 to a resistor 56 which is in turn connected between the capacitor 28 and the Diac 36. The diodes 50 and 52 prevent the transistors 46 and 48, which form a linear amplifier, from becoming back biased as the line voltage changes, while the variable resistance 44 controls the amplifier gain. The transistors 46 and 48 of the linear amplifier will be polarized in time in response to the condition of reference voltage at point A.

The manner in which the speed control system 14 operates to control the speed of the motor formed by the armature 10 and field winding 12 may best be understood from a brief consideration of the alterations which this system accomplishes in the waveform of FIG. 2c and the resultant variations in the operation of the Triac 16. First, from FIG. 2d, it will be noted that only a portion of each half cycle of input voltage is supplied to the motor from the input lines 18 and 20. This is due to the fact that when the Triac 16 is not conducting, the motor is disconnected from the power supply, but it is important to note that the motor is still connected at point B to the speed control system 14. Thus, as indicated in FIG. 2d, only a portion of each half cycle of the power supply waveform is provided to the motor, and this portion is determined by a gating point at which the voltage on the capacitor 28 exceeds the breakover point of the Diac 36. Therefore, it will be apparent that by varying the charging curve for the capacitor 28, the firing angle of the Diac 36 may also be correspondingly varied to increase or decrease the conduction time of the Triac 16, and consequently the motor power supply waveform of FIG. 2d.

When the Triac 16 has been conducting and then ceases conduction as the input waveform from the power supply changes polarity, the current in the armature 10 will begin to decay producing a residual armature current. The armature is completely disconnected from the AC power supply, and so, due to motor commutation, a plurality of small voltage pulses having an amplitude indicative of the residual armature current appear at point B. These voltage pulses, indicated in FIG. 2e, are an accurate representation of motor speed, for the pulses occur with the power supply completely disconnected from the armature and therefore are not affected by error producing internal resistances in the armature or variations in the power supply. As the load on the motor including the armature 10 and field winding 12 increases, the residual armature current goes up, and conversely, as the load decreases, the residual armature current goes down. The voltage pulses of FIG. 2e follow this residual armature current.

It will be apparent that if the voltage pulses of FIG. 2e are applied via the resistor-capacitor combination 38 and 40 through the variable resistor 44 to point A and are also inverted by the linear amplifier formed by the transistors 46 and 48, these inverted amplified pulses will be applied across the resistor 56 to the capacitor. The additional current through the resistor 56 alters the charging slope of the capacitor charging voltage of FIG. 2c as illustrated in FIG. 2f. This alteration in the capacitor charging slope, advances the firing angle of Diac 36 so that Triac 16 is conducting for a greater portion of the AC cycle of the supply voltage on the lines 18 and 20 as illustrated by FIG. 2g. Additional power to the motor will then compensate for any loss in speed that would normally occur with increased load.

To accomplish the speed control function illustrated by the waveforms of FIG. 2, the speed control system 14 is adjusted under no load conditions to provide the minimum desired charging slope for the capacitor 28 and the minimum firing angle for the Diac 36. This will permit any signal from the armature 10 to alter the charging slope for the capacitor 28 and to advance the Diac firing angle. As an example, variable resistor 32 may be adjusted with a 120 volt – 60 cycle power supply to provide 30 volts RMS across the motor. Variable resistor 44 is then adjusted so that the sensed signal from the motor is allowed to change the charging of capacitor 28 so that the motor voltage is increased to 50 volts RMS. This adjustment is made for a no load condition so that when a mechanical load is applied to the motor, the amplitude of the armature pulses (FIG. 2e) is increased and the firing angle of Diac 36 is advanced. Variable resistor 32 can then be used as a speed adjustment control and the speed of the motor can be changed over at least a two to one ratio.

Turning now to the detailed operation of the speed control system 14, consider first that the input line 20 is positive with respect to the input line 18 but the Triac 16 is non-conducting. The voltage at the anode of the Triac 16 is postive and therefore a positive voltage is applied to point B. Point A is also positive and the current from resistor 38 will flow to the base of the NPN transistor 46. Normally, the transistor 46 would conduct if the voltage at point B is more positive than that at point A, but the transistor is not polarized for conduction for this half cycle of the input voltage and transistor 48 is completely turned off by the applied current from resistor 38. Therefore, there is no conduction in either transistor 46 or 48.

At the end of the half cycle, line 20 begins to go negative applying voltage to Diacs 22 and 24 and polarizing transistor 46. Points A and B follow each other closely, and the stored energy in the armature 10 is now converted to a voltage across resistor 38, capacitor 40, and through variable resistor 44, point A and resistor 26 back to the other side of the armature. The polarity of this voltage is of opposite polarity to the supply voltage through the field 12 and armature 10 when the Triac 16 was conducting during the previous half cycle and constitutes a series of pulses each representing a commutator slot. These voltage pulses are inverted by the NPN transistor 46 and a current is applied through the diode 50 and resistor 56 to change the charging slope for the capacitor 28. The normal charging time of the capacitor was previously determined by the current through resistor 30, the variable resistor 32, and the resistor 34. The additional current through resistor 56 alters the charging slope as shown in FIG. 2f.

When the breakover voltage of the Diac 36 is reached and a gating signal is applied to gate the Triac 16 into conduction with a positive signal on line 18, point B is pulled negative driving transistor 48 to saturation and adding to the drive applied to the Diac 36 so that the Triac 16 is locked on. This is an important function of the amplifier formed by the transistors 46 and 48 and insures that once the Triac is triggered, it is locked into conduction for substantially the remainder of the half cycle of supply voltage. On the opposite half cycle of operation, the transistor 46 is driven to saturation once the Triac is conducting to lock the Triac into conduction.

It must be noted that the speed control system 14 makes no attempt to limit either the supply voltage or current through the motor and that the full power available from the power source may be employed by the motor. Also, control is achieved on each half cycle of the input voltage, and a full AC voltage is applied across the motor. Sensing of motor condition is accomplished with the motor disconnected from the power supply, thereby eliminating from the control signals fed to the speed control system the effects of power supply variations and the residual effects of internal armature resistance. It will therefore be apparent that the motor speed control system of the present invention provides a compact, accurate system which does not severely limit the power available to the motor.

What is claimed is:

1. A motor speed control system for a series connected AC motor powered by an AC signal from an AC power source and having a series connected armature and field winding comprising switching means connected in series with said motor across said power source, said switching means being operable to connect said motor directly to said power source, switch control means connected to said switching means and operating at a gating point in each half cycle of the AC signal to cause said switching means to connect said motor to the power source, said switching means operating to subsequently disconnect the motor from the power source toward the end of each half cycle of the AC signal, and sensing means connected to said armature and switch control means to sense the residual current from the armature when the motor is disconnected from said power source, said sensing means operating to cause said switch control means to determine the gating point in the next succeeding half cycle of the AC signal in response to the amplitude of said armature residual current.

2. The motor speed control of claim 1 wherein said switch control means is operative to set a minimum gating point in each half cycle of the AC signal for a no load operating condition of said motor, said gating point being advanced relative to said minimum gating point in accordance with the armature residual current sensed by said sensing means when a load is applied to said motor.

3. The motor speed control system of claim 2 wherein said switch control means includes reference voltage means for providing a reference voltage of substantially constant amplitude on each half cycle of AC power signal, a capacitor connected to charge from said reference voltage means, and threshhold means connected to conduct a signal from said capacitor when the charge on said capacitor reaches a threshhold level sufficient to cause conduction of said threshhold means.

4. The motor speed control system of claim 3 wherein said sensing means operates during the charging of said capacitor to provide an output signal to said capacitor having an amplitude which is a function of the amplitude of said armature residual current, said sensing means output signal combining with said reference voltage to increase the slope of the charging voltage for said capacitor.

5. The motor speed control system of claim 4 wherein said switch control means includes variable resistance means connected between said reference voltage means and said capacitor, said variable resistance means being operable to vary said minimum gating point.

6. The motor speed control system of claim 5 wherein said switching means includes a bidirectional solid state switch connected between said armature and power supply and having a gate electrode for triggering conduction of said switch upon the reception of a gating signal by said gate electrode, said gate electrode being connected to receive signals from said threshhold means.

7. The motor speed control system of claim 4 wherein said switching means is connected between said armature and said power supply, said sensing means being connected between said armature and switching means and providing a current path for said armature residual current which extends from said armature to the opposite side of said motor, the sensing means including amplifier means connected to said current path for amplifying signals therein caused by said armature residual current, the output from said amplifier means being connected to said capacitor.

8. The motor speed control system of claim 7 wherein said amplifier means includes first and second complementary transistor means having commonly connected base and emitter electrodes connected to said current path and collector electrode circuits connected to a common output means, said complementary transistor means operating alternatively during the charging of said capacitor with each half cycle of said supply voltage to provide the output of said amplifier means to said capacitor.

9. The motor speed control system of claim 8 wherein said switching means is a bidirectional solid state switch having a gate electrode for initiating conduction by said switch upon reception thereby of a gating signal, said gate electrode being connected to receive signals from said threshhold means, said first and second complementary transistor means being respectively driven to saturation when conducting upon conduction of said bidirectional solid state switch to increase the amplifier means output to said threshhold means.

10. The motor speed control system of claim 9 wherein variable resistance means are provided in said current path to vary the gain of said amplifier means.

* * * * *